Oct. 9, 1962  R. B. SMOCK  3,057,196

FORCE PROVING RING

Filed May 26, 1960

INVENTOR.
R. B. SMOCK

BY
ATTORNEYS

United States Patent Office 3,057,196
Patented Oct. 9, 1962

3,057,196
FORCE PROVING RING
Robert B. Smock, 2321 E. Stroop Road, Dayton 40, Ohio
Filed May 26, 1960, Ser. No. 32,061
5 Claims. (Cl. 73—141)
(Granted under Title 35, U.S. Code (1952), sec. 266)

The invention described herein may be manufactured and used by or for the United States Government for governmental purposes without payment to me of any royalty thereon.

This invention relates generally to a proving instrument for calibrating a testing machine and, more specifically, to a force proving ring comprising an elastic metallic loop and an optical means for measuring the deflection of a portion of the loop when a load is applied thereto.

Prior to the present invention, various types of proving rings were employed in conjunction wtih the calibration of compression loads of various types of testing machines, such as Brinell testing machines, or the like. Some of these prior proving rings measured the extent of deflection under load by a vibrating reed combined with a micrometer screw or dial indicator. Such proving rings were generally limited to an accuracy of ten thousandths of an inch due to human and mechanical factors.

Subsequent proving rings employed an optical device in combination therewith which permitted deflection readings to an accuracy of one hundred thousandths of an inch. The optical device normally employed in such instruments was a microscope mounted on the stationary portion of the proving ring and having a vernier scale on the eye piece thereof which, in conjunction with a ruled target scale mounted on a slide adapted to move vertically responsive to the deflection of the proving ring, permitted such accurate measurements of the deflection of the proving ring to be easily transmitted to the eye of the reader. Since the vernier scale was mounted in the microscope, it was essential that the microscope be secured to and correctly positioned with respect to the proving ring structure for correct alignment of the vernier scale with the target scale. This alignment was easily lost, for example, in using the microscope as a handle when lifting the structure, thereby destroying the accuracy of the instrument.

It is, therefore, an object of the present invention to provide a proving ring incorporating an improved optical reading device having a target scale and a vernier scale in constant alignment for measuring the deflection of the proving ring and including provisions for an optional magnifying means for reading the scales.

It is another object of the present invention to provide a force proving ring in combination with an improved optical device for accurately measuring the deflection thereof, the optical device consisting of a target scale fixedly mounted on the movable portion of the proving ring and vertically movable in response to the deflection thereof, and a vernier scale fixedly mounted on the stationary portion of the proving ring.

A further object of the present invention is to provide a fixed vernier scale relative to a movable target scale for measuring the deflection of a proving ring when subjected to a force, and to further provide a portion of the proving ring being adapted to optionally receive a magnifying lens for reading the scales to ten thousandths of an inch or a microscope for reading the scale to one hundred thousandths of an inch.

The novel features characteristic of the present invention, as well as additional objects and advantages thereof, will be better understood in the following detailed description of a single embodiment thereof, when read in connection with the accompanying drawings in which.

Figure 1:
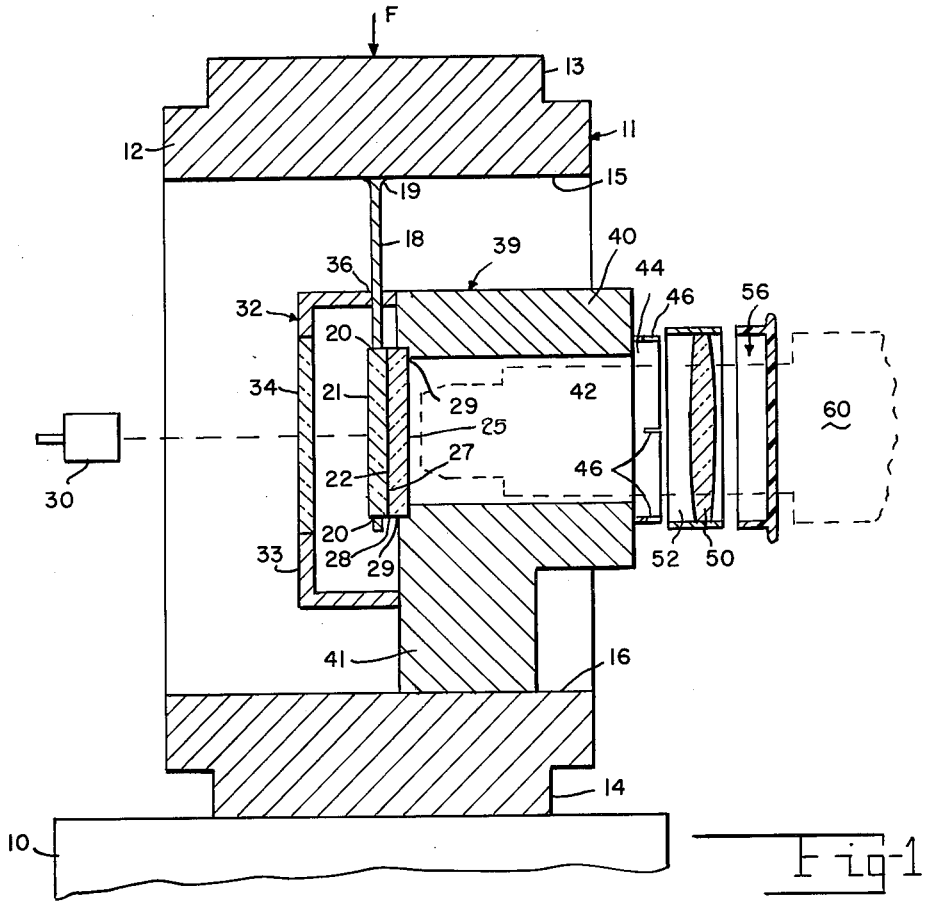
FIG. 1 is a sectional view in elevation of the proving ring and the improved optical device of the present invention.

Referring now to FIG. 1, there is shown a flexible metallic unitary ring body of elliptical shape, indicated generally at 11. The ring or loop 11 shown in the preferred embodiment is elliptical in shape with the major axis in the horizontal plane; however, it will be understood that a circular proving ring may be substituted therefor without departing from the spirit of the present invention.

Ring 11, as shown, is particularly adapted for downward deflection responsive to a compressive force F, but it is readily apparent that the present ring 11 may be modified to measure the deflection due to tensile forces as well.

Integral wtih ring body 11 is a flat, bottom wall portion 14 for engagement with a supporting surface 10. Perpendicularly opposed to bottom wall portion 14 is an upper wall portion 12 having integral therewith a compressive load receiving boss 13 whose top surface is adapted for receiving the force indicated by the arrow F.

Figure 2:
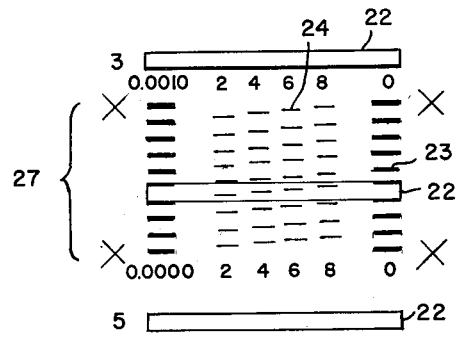
FIG. 2 is a fragmentary elevational view showing the fixed vernier scale superimposed over the vertically movable target scale.

Fixedly attached to and depending downwardly from the under surface 15 of upper wall portion 12 is a pendant scale support 18 which is fixed to the under surface 15 at 19, as by brazing or welding. Support 18 is preferably thin, flexible and generally rectangular in shape. Positioned within support 18 is a slot or opening 20 for the mounting therein of a target lens 21 having on its inner face a target scale 22, as shown in FIG. 2.

An upright L-shaped block 39 having a horizontally disposed upper portion 40 and a vertically disposed lower portion 41 is fixedly attached to the surface 16 of ring base portion 14, as by welding or brazing. The upper portion 40 of block 39 is substantially square in cross section and has a horizontally disposed circular bore 42 extending through the entire length of the upper portion 40. The front of bore 42 is countersunk at 29 to accommodate a vernier lens 25, which contains a vernier scale 27 on its outer face. Vernier lens 25 is positioned relative to target lens 21 so as to give a reading equivalent to zero force on the scales prior to the application of a force F on boss 13. In order to eliminate as many distortive effects as possible, target scale lens 21 is in sliding contact with vernier scale lens 25, so that the vernier scale 27, as will be hereinafter described, will be in constant superimposed relation to target scale 22. In order to reduce the friction between the two lenses to a minimum, a thin clear lubricating film, such as Vaseline or the like, is placed between the two adjacent surfaces.

In order to keep the two scale lenses free from dust and other foreign objects, a housing 32 is fixedly attached to block 39. Housing 32 has positioned in the top portion thereof a slot 36 through which is inserted scale support 18 and which allows support 18 to move vertically without any restraining or binding effects. Housing 32 further includes a front wall portion 33 having fixed therein a low power, positive lens 34 which is aligned axially with bore 42, target scale lens 21 and vernier lens 25 and in parallel relation to both of the aforementioned lenses. Lens 34 is further adapted to collimate the light from a monochromatic light source 30 so as to present clearer and sharper image scale readings to the eye of the reader.

Mounted in axial alignment with bore 42 and spaced distally from vernier lens 25 is an annular retaining ring 44 which is fixedly mounted on block 39 and has a plurality of equally spaced slots 46 on its periphery for adjustably securing thereto a magnifying lens 50 mounted in a peripheral flange 52 which is adapted to fit over retaining ring 44. The bore 42 is of sufficient length to place the vernier lens 25 and the magnifying lens 50 a distance apart corresponding to the focal length of the magnifying lens 50. With the arrangement as shown, it will be obvious that magnifying lenses of varying power may be used, depending upon the degree of accuracy of reading desired. When the proving instrument is not in use, a cover 56 made of plastic or similar material is placed over the retaining ring 44 to prevent dust and other foreign matter from accumulating within bore 42 and contacting vernier lens 25.

When it is desired to obtain a reading of the scales to an accuracy of one hundred thousandths of an inch, the magnifying lens 50 is removed from retaining ring 44, thereby clearing the entrance to bore 42, so that a microscope 60, suitably self-supported, shown in FIG. 1 in phantom, may be inserted into bore 42 with the objective of microscope 60 juxtaposed with vernier lens 25. Inasmuch as microscope 60 is used solely for magnification of the scale reading, it is not necessary to fix the position of the microscope 60 relative to block 40 in the vernier scale 25, as bore 42 will provide sufficient guide means for aligning microscope 60 with the target and vernier scales, respectively.

Referring now to FIG. 2, there is shown the vernier scale generally indicated at 27 superimposed over the target scale 22. Vernier scale 27 is comprised of an outer scale 23 having relatively heavy, equally spaced lines graduated between .0010 of an inch, and an inner scale 24 consisting of a series of staggered columns of lighter lines graduated to .00002. A large X mark is positioned at each of the four corners of the generally rectangularly shaped vernier scale 27 to enable the reader to easily pick up the vernier scale and measure the deflection by using the outer scale 23 when using a magnifying lens 50. Such a reading will enable the reader to measure the deflection of the proving ring to ten thousandths of an inch by using only the outer scale 23. When a greater degree of accuracy is desired the magnifying lens 50 is removed and the objective of the microscope 60 is inserted within bore 42 to enable the reader to use the inner scale 24 to obtain an accurate measurement of the deflection of the proving ring to one hundred thousandths of an inch. Therefore, the reading obtained from FIG. 2 when using the magnifying lens is .0044, and the reading obtained when using the microscope is .00441.

It will be obvious to those persons skilled in the art that various changes and improvements may be made on the present invention without departing from the scope of the invention. For example, the means for attaching the magnifying lens to block 40 may be a threaded arrangement or a clamping arrangement, as desired. It is therefore intended that the particular embodiment of the invention described herein be considered as illustrative only and is limited only within the scope of the appended claims.

I claim:

1. A proving instrument comprising an upright flexible metallic loop having a bottom wall mountable on a supporting surface and a diametrically opposed load receiving wall, an optical viewing means for measuring the deflection of the loop responsive to the application of a force upon the load receiving wall, said optical viewing means comprising a lens support fixed at the upper end thereof to the underside of said load receiving wall and adapted to move vertically in response to the deflection of the loop, a target lens mounted in said lens support and having a target scale positioned on one face thereof, a block having a base portion and an upper portion, said base portion of said block being fixedly attached to the upper side of said bottom wall of said loop, said upper portion of said block having a horizontally disposed bore therethrough, a vernier lens having a vernier scale positioned on one face thereof and fixedly mounted in one end of said bore, said target lens being juxtaposed with said vernier lens for superimposing said vernier lens scale upon said target lens scale, a hollow housing fixedly attached to said block and adapted to enclose said target lens and said vernier lens to provide substantially dust-free protection therefor, a light-collimating lens mounted in said housing and adapted to collimate the light from a monochromatic light source for illuminating the said target scale and vernier scale, and means for magnifying the reading on said target scale and said vernier scale, all of said lenses and said magnifying means being in axial alignment to enable the reader to accurately measure the deflection of the loop when subjected to a force.

2. In combination with a proving ring, an optical viewing device for measuring the deflection of a portion of the proving ring when a force is applied thereto, said optical viewing device comprising a pendant support fixedly attached at the upper end thereof to the deflecting portion of the proving ring, a target lens securely mounted in said pendant support and having a target scale positioned on one face thereof, an upright block having an upper and a lower portion, the lower portion of said block being fixedly attached to said proving ring, the upper portion of said block having a horizontally disposed bore therethrough, said bore having a counterbore positioned in one end thereof, a vernier lens having a vernier scale positioned on one face thereof and being mounted in said counterbore for fixedly attaching said vernier lens to said block, said vernier lens being juxtaposed with said target lens for sliding engagement therewith, a hollow housing fixedly attached to said block and having a low power positive lens positioned in one face thereof for collimating the light from an external monochromatic light source to illuminate the target scale and the vernier scale, a metallic retaining ring positioned axially of said bore and positioned distally of said vernier lens, a magnifying lens having a peripheral retaining flange attached thereto for engagement with said retaining ring, the length of said bore being such as to position the magnifying lens a distance away from the vernier lens corresponding to the focal length of said magnifying lens for enabling the operator of the proving ring to read the scales for measuring the deflection of the proving ring to an accuracy of ten thousandths of an inch.

3. The proving instrument of claim 1, wherein the vernier scale is comprised of an outer scale for enabling the operator of the proving ring to measure the deflection thereof to an accuracy of ten thousandths of an inch and an inner scale for measuring the deflection thereof to an accuracy of one hundred thousandths of an inch.

4. The proving instrument of claim 1, wherein the magnifying means includes a magnifying lens adapted for engagement with the said block for reading the scales to an accuracy of ten thousandths of an inch.

5. The proving instrument of claim 1, wherein the magnifying means is a microscope positioned in said bore for reading the scales to an accuracy of one hundred thousandths of an inch.

References Cited in the file of this patent
UNITED STATES PATENTS
2,830,451 Gauld _____ Apr. 15, 1958